United States Patent [19]

Wolfe, Jr.

[11] 4,371,693
[45] Feb. 1, 1983

[54] THERMOPLASTIC ELASTOMERIC POLYETHERESTERIMIDES

[75] Inventor: James R. Wolfe, Jr., Wilmington, Del.

[73] Assignee: E. I. Du Pont de Nemours and Company, Wilmington, Del.

[21] Appl. No.: 308,131

[22] Filed: Oct. 2, 1981

[51] Int. Cl.³ .................. C08G 69/08; C08G 69/44
[52] U.S. Cl. .................... 528/292; 525/438; 528/289; 528/291; 528/296; 528/301
[58] Field of Search ............ 528/289, 291, 292, 296, 528/301; 525/438

[56] References Cited

U.S. PATENT DOCUMENTS

| | | | |
|---|---|---|---|
| 3,274,159 | 9/1966 | Kluiber | 528/296 X |
| 3,458,480 | 7/1969 | Schmidt et al. | 528/289 |
| 3,697,471 | 10/1972 | Schmidt et al. | 260/33.4 P |
| 3,784,520 | 1/1974 | Hoeschele | 528/274 X |
| 3,852,246 | 12/1974 | Schmidt et al. | 528/289 |
| 4,205,158 | 5/1980 | Hoeschele | 528/296 |
| 4,321,341 | 3/1982 | Neuberg et al. | 528/296 X |

FOREIGN PATENT DOCUMENTS 44-20477 9/1969 Japan .

OTHER PUBLICATIONS

European Polymer Journal, vol. 16, pp. 909–916, "Synthesis and Story of Various Reactive Oligomers and Poly(Ester-Imide-Ether)s", Oct. 12, 1979, P. Honore, et al.

*Primary Examiner*—Lucille M. Phynes

[57] ABSTRACT

Thermoplastic elastomeric polyetheresterimides comprising a multiplicity of long chain ester imide units represented by the formula

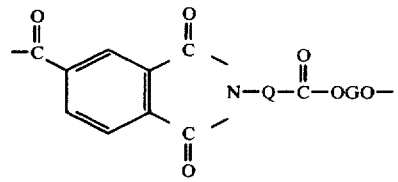

and short chain esterimide units represented by the formula

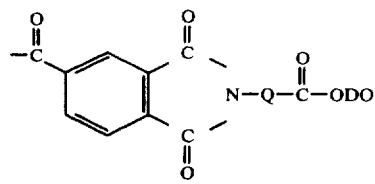

where G is a divalent radical remaining after the removal of terminal hydroxyl groups from a poly(alkylene oxide) glycol having a number average molecular weight of about 400–4000; D is a divalent radical remaining after removal of hydroxyl groups from a diol having a molecular weight less than about 300, and Q is a divalent radical remaining after removal of an amino group and a carboxyl group from a aliphatic primary amino acid having a molecular weight of less than 250; with the proviso that from about 2 to 10 of said short chain esterimide units are present for each of said long chain esterimide units.

6 Claims, No Drawings

THERMOPLASTIC ELASTOMERIC POLYETHERESTERIMIDES

BACKGROUND OF THE INVENTION

Thermoplastic copolyetherester elastomers, such as those disclosed in U.S. Pat. No. 3,766,146, are known for their generally good physical properties and their outstanding processing characteristics. Unfortunately, these copolyetheresters are deficient in scuff resistance which reduces their suitability in certain applications. Moreover, lower hardness grades of copolyetheresters lack toughness; for instance, their tensile and tear strengths are often lower than desired.

A unique class of copolyetherester elastomers containing imide-diacid segments and polyether segments has been found. The polymers are thermoplastic elastomers which have improved scuff resistance and excellent stress-strain properties even at low hardnesses.

SUMMARY OF THE INVENTION

A thermoplastic elastomeric polyetheresterimide comprising a multiplicity of long chain esterimide units being represented by the formula

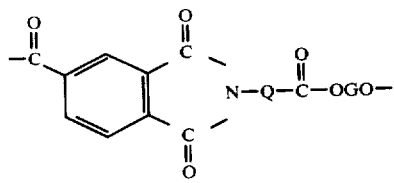

and short chain esterimide units being represented by the formula

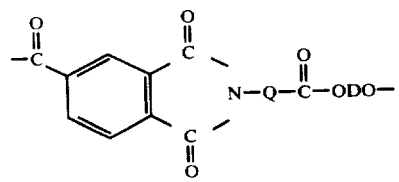

where G is a divalent radical remaining after the removal of terminal hydroxyl groups from a poly(alkylene oxide)glycol having a molecular weight of about 400–4000; D is a divalent radical remaining after removal of hydroxyl groups from a diol having a molecular weight less than about 300 and Q is a divalent radical remaining after removal of an amino group and a carboxyl group from an aliphatic primary amino acid having a molecular weight of less than 250; with the proviso that 2 to 10 of said short chain esterimide units are present for each of said long chain esterimide units.

DETAILED DESCRIPTION

The polymers of this invention comprise two recurring types of structural units in a specified molar ratio. The units represented by the general formula

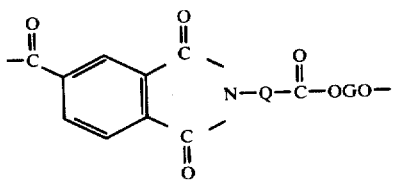

will be referred to as "long chain esterimide units", and those represented by

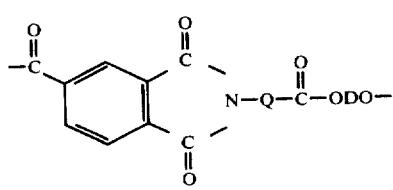

will be referred to as "short chain esterimide units".

Both the long chain and the short chain esterimide units contain an imide-diacid radical which can be obtained by reacting one mole of trimellitic anhydride with an aliphatic primary amino acid. As will be explained in greater detail hereinafter, the imide-diacid or an ester-forming equivalent thereof can be prepared in a separate step prior to polymerization or it can be prepared during the polymerization.

Amino acids which can be used to provide the —Q—radicals in the polymers of this invention are aliphatic (including cycloaliphatic) primary amino acids having a molecular weight of less than about 250. Amino acids containing aromatic rings in which the amino group is attached to aliphatic carbon, such as phenylalanine or 4-($\beta$-aminoethyl)benzoic acid, are also meant to be included. Representative aliphatic (and cycloaliphatic) primary amino acids are glycine, alanine, $\beta$-alanine, phenylalanine, 6-aminohexanoic acid, 11-aminoundecanoic acid and 4-aminocyclohexanoic acid. Of these amino acids, glycine and $\beta$-alanine are preferred because they are readily available and yield polymers having excellent physical properties.

Low molecular weight diols which can be used to provide the —D—radicals are aliphatic diols having a molecular weight of less than 250, preferably below about 150. Ester-forming equivalents of diols such as esters are also meant to be included, with the understanding that the molecular weight limitation pertains to the diol and not to its ester-forming equivalents. Included among the low molecular weight diols are aliphatic (including cycloaliphatic) dihydroxy compounds. Preferred are diols with 2–15 carbon atoms such as ethylene, 1,2- and 1,3-propylene, isobutylene, tetramethylene, pentamethylene, 2,2'-oxydiethanol, 2,2-dimethyltrimethylene, hexamethylene and decamethylene glycols, 1,3- and 1,4-dihydroxycyclohexane and cyclohexane dimethanol. More preferred are aliphatic diols containing 2–8 carbon atoms. Ethylene glycol, 1,2-propylene glycol and 1,4-butanediol are especially preferred for providing the —D—radicals in the polymers of this invention because of their availability.

Polyether glycols from which the —G—radicals are derived have number average molecular weights of 400–4000. Representative long chain glycols are poly(ethylene oxide) glycol, poly(1,2- and 1,3-propylene oxide) glycol, poly(tetramethylene oxide) glycol, random or block copolymers of ethylene oxide and 1,2-propylene oxide and random or block copolymers of tetrahydrofuran with minor amounts of a second monomer such as ethylene oxide, propylene oxide or methyltetrahydrofuran. Poly-formal glycols prepared by reacting formaldehyde with diols such as 1,4-butanediol and 1,5-pentanediol are also useful. Preferred polyether glycols are poly(tetramethylene oxide) glycol having a number average molecular weight of 600–2200 and ethylene oxide-capped poly(propylene oxide) glycol having a number average molecular weight of 600–2800 and containing 5–35% by weight of ethylene oxide because they yield polymers with good properties.

The amounts of monomers employed in preparing the polymers of the present invention must be selected so that the finished polymer contains about 2 to 10 short chain esterimide units per long chain esterimide unit. Polymers containing less than about 2 short chain esterimide units per long chain esterimide unit generally exhibit poorer stress-strain properties, low softening points and reduced solvent resistance. As the proportion of short chain esterimide units is increased over the range of 2 to 10, increases in modulus, tensile strength, tear strength, solvent resistance and softening point are observed while elongation decreases. Scuff resistance is good to excellent over the entire range. At ratios of short chain to long chain esterimide units greater than about 10, the elastomeric character of the polymers decreases.

The polymers of the present invention can be prepared readily by melt condensation procedures. Typically, the procedure involves the reaction in the presence of a titanate catalyst of an imide-diacid or an ester thereof with a mixture of a poly(alkylene oxide) glycol and a low molecular weight diol, the latter being present in a molar excess. Initially, reaction takes place at about atmospheric pressure while the temperature is increased up to about 240°–300° C. while distilling off volatiles. The resulting prepolymer of relatively low molecular weight can be converted to a high molecular weight polymer by continuing the reaction at 240°–300° C. at reduced pressures, preferably less than 670 Pa and more preferably at less than 250 Pa.

The typical procedure can be varied because it is possible to preform the imide-diacid or ester thereof in a separate step prior to initiating the melt condensation or to form the imide-diacid or ester thereof during the course of the melt condensation.

Synthesis of imide-diacids can be accomplished by reacting 1 mole of trimellitic anhydride per mole of amino acid by refluxing in a suitable solvent such as glacial acetic acid. The diacid is recovered by cooling the reaction mass and filtering. Preparation of imide-diacids is not meant to be limited to the procedure just described which is illustrative of synthetic methods known in the art.

When preparing the polymers of this invention by the procedure in which the imide-diacid or ester thereof is formed during the course of the melt condensation, trimellitic anhydride and the amino acid are charged in place of the preformed diimide-diacid or its ester along with the other ingredients. From then on, the melt condensation is conducted in substantially the same manner as previously described. In theory, one mole of trimellitic anhydride reacts with one mole of amino acid; however, when the imide-diacid is prepared in the presence of the low molecular weight diol and the poly(alkylene oxide) glycol, a minor amount of trimellitic anhydride reacts with available hydroxyl groups and ultimately functions as a branching agent in the finished polymer. Within limits, the degree of branching in the finished polymer can be controlled by varying the mole ratio of trimellitic anhydride to amino acid. An excess of amino acid reduces the degree of branching, while an excess of the anhydride increases branching. Ratios of 1.0 mole of trimellitic anhydride to 0.85–1.15 moles of amino acid yield useful polymers. In addition to controlling branching by varying the anhydride/diamine mole ratio, one can compensate for branching by introducing a monofunctional reactant such as benzoic acid in minor amounts.

With reference to branching, it should be noted that polymers of this invention, when prepared from preformed imide-diacids, are substantially free of branching. If branching is desired, one needs only to introduce a branching agent, such as trimellitic anhydride, along with the preformed imide-diacid. The amount of branching agent generally will be less than 0.15 moles per mole of imide-diacid or ester thereof. Useful branching agents other than trimellitic anhydride include trimethyl trimellitate, glycerol, trimethylol propane, trimesic acid and its esters and the like.

It is customary to employ a catalyst while carrying out the melt condensation. While a variety of catalysts can be employed, organic titanates such as tetrabutyl titanate used alone or in combination with magnesium acetate or calcium acetate are preferred. The catalyst should be present in amounts of about 0.005 to 2.0 percent by weight based on the total reactants.

Both batch and continuous methods can be used for any stage of polymer preparation. Further polymerization of lower molecular weight polymers can also be accomplished in the solid phase by heating solid polymer particles in a vacuum or in a stream of inert gas to remove liberated low molecular weight diol. This method reduces thermal degradation because it must be used at temperatures below the softening point of the polymer.

The preparation of the polymers of this invention can be carried out in the presence of an antioxidant. While antioxidants are not normally required on a laboratory scale, their use is preferred on a commercial scale.

The imide-diacid or its ester-forming equivalents and the poly(alkylene oxide) glycol are incorporated in the polymers of this invention in the same molar proportions as are present in the initial reaction mixture. The amount of low molecular weight diol actually incorporated corresponds to the difference between the moles of imide-diacid and the moles of polyether glycol. When mixtures of low molecular weight diols are used, the proportion of each diol incorporated is largely a function of the amounts of the diols present, their boiling points, and relative reactivities.

Although the polymers of this invention possess many desirable properties, it is sometimes advisable to stabilize certain of the compositions to heat or radiation by ultraviolet light. Fortunately, this can be done readily by incorporating stabilizers. Satisfactory stabilizers comprise phenols and their derivatives, amines and their derivatives, compounds containing both hydroxyl and amine groups, and polymeric phenolic esters.

Representative phenol derivatives useful as stabilizers include
N,N'-hexamethylenebis(3,5-di-tert-butyl-4-hydroxyhydrocinnamamide),
4,4'-bis(2,6-ditertiary-butylphenol), 1,3,5-trimethyl-2,4,6-tris[3,5-ditertiary-butyl-4-hydroxybenzyl]benzene and
4,4'-butylidene-bis(6-tertiary-butyl-m-cresol).
Typical amine stabilizers include
4,4'-bis(α,α-dimethylbenzyl)diphenylamine,
N,N'-bis(beta-naphthyl)-p-phenylenediamine,
N,N'-bis(1-methylheptyl)-p-phenylenediamine and
either phenyl-beta-naphthylamine or its reaction products with aldehydes. Mixtures of hindered phenolic or amine stabilizer with esters of thiodipropionic acid, mercaptides and phosphite esters are particularly useful. Additional stabilization to ultraviolet light can be obtained by compounding with various UV absorbers such as substituted benzophenones or benzotriazoles. Hindered amine photostabilizers such as bis(1,2,2,6,6-pentamethyl-4-piperidinyl) n-butyl (3,5-di-tert-butyl-4-hydroxybenzyl)malonate are also useful.

The properties of these polymers can be modified by incorporation of various conventional inorganic fillers such as carbon black, silica gel, alumina, clays and chopped fiberglass. In general, these additives have the effect of increasing the modulus of the material at various elongations. Compounds having a range of hardness values can be obtained by blending hard and soft polymers of this invention.

The polyetheresterimides of this invention have improved scuff resistance. In addition, the polymers have outstanding stress-strain properties even at low hardnesses which sets them apart from prior art thermoplastic elastomers. Thus the polymers are useful in many end uses which have been filled by prior art thermoplastic elastomers. In addition, their scuff resistance makes the present polyetheresterimides particularly useful in applications such as cable, belt and hose coverings where resistance to scraping, cutting and gouging is important.

Processing of the polyetheresterimides is possible by typical molding and extrusion techniques. The materials can be injection, compression, transfer and blow molded to form a variety of articles. They can be extruded to form films, tubing and other forms of more complex cross-sections. They can be crosshead extruded for hose, wire and cable covers. They can be calendered to produce films and sheets or to produce calender-coat fabrics or belts. In finely divided form, they can be used in rotational molding and powder coating techniques.

EXAMPLES

Polymer Test Methods

Copolymer inherent viscosities were determined at 30° C. at a concentration of 1 g/L in m-cresol. Test methods used on compression molded slabs were:

| | |
|---|---|
| stress at 100% and 300% elongation at 8.5 mm/s | ASTM D412 |
| tensile strength at break at 8.5 mm/s | ASTM D412 |
| elongation at break at 8.5 mm/s | ASTM D412 |
| permanent set 300 s after break | ASTM D412 |
| Clash-Berg torsional modulus | ADTM D1043 |
| trouser tear strength at 21 mm/s | ASTM D1938 |
| Shore hardness | ASTM D2240 |

Stress-strain measurements were run using nonstandard dumbbells 89 mm long having tab ends 16 mm wide and a central narrow portion 6.4 mm wide by 32 mm long died from slabs about 0.64 mm thick. Trouser-tear strength measurements were made on samples 38 mm×76 mm×0.64 mm slit lengthwise 38 mm up the center. Other tests were run on samples obtained from slabs about 1.9 mm in thickness.

Scuff resistance was estimated by pressing the sharp edge of the curved portion of a No. 10 "X-acto" knife blade in a fountain-pen type holder against the surface of a 1.9 mm compression-molded slab and rapidly drawing the blade across the polymer surface while pressing the sharp edge of the blade forcefully against the surface. The long axis of the blade is held perpendicular to the direction of draw, thus providing a scraping action rather than a cutting action. The blade was held perpendicular to the surface of the slab. Scuffing is evidenced by the formation of a rough to-the-touch surface along the path of the blade. A smooth surface path indicates no scuffing.

EXAMPLE 1

A 500 ml glass resin kettle was equipped with a stainless-steel paddle stirrer having a shape conforming to the bottom of the kettle and placed close to the bottom of the kettle. The following materials were charged to the resin kettle.

| | |
|---|---|
| poly(tetramethylene ether) glycol of number-average molecular weight 1000 | 25.0 g (0.025 mol) |
| glycine | 9.38 g (0.125 mol) |
| trimellitic anhydride | 24.0 g (0.125 mol) |
| ethylene glycol | 15.5 g (0.25 mol) |
| N,N'—hexamethylenebis-(3,5-di-tert-butyl-4-hydroxyhydrocinnamamide) | 0.3 g |

The kettle was fitted with a head with an outlet to a cooled trap and a vacuum system. The kettle was alternately evacuated and filled with nitrogen 4 times. To the contents of the kettle was added as a catalyst 0.8 ml of a 5% (vol) solution of tetrabutyl titanate in 1,4-butanediol. The kettle was immersed in an oil bath at about 180° C. The oil bath was heated to about 250° C. over a period of about one hour while the reaction mixture was stirred. The kettle was then evacuated to a pressure of less than 13 Pa. After stirring about one hour at about 250° C. and less than 13 Pa there was recovered 36 g of polymer having the properties listed below.

| | |
|---|---|
| inherent viscosity, dL/g | 3.11 |
| stress at 100% elongation, MPa | 7.1 |
| stress at 300% elongation, MPa | 10.7 |
| tensile strength at break, MPa | 18.7 |
| elongation at break, % | 560 |
| permanent set at break, % | 162 |
| trouser tear strength 21 mm/s, kN/m | 70 |
| Shore D hardness | 38 |
| Clash-Berg $T_{10000}$, °C. | −23 |

The scuff resistance test indicates the polymer scuffs less than a prior art copolyetherester elstomer having the composition 60% (wt) tetramethylene terephthalate/40% poly(tetramethylene ether, m.w. 1000) terephthalate. Test samples were prepared from slabs compression molded at 232° C.

EXAMPLE 2

The following materials were charged to the resin-kettle apparatus described in Example 1:

| | |
|---|---|
| poly(tetramethylene ether) glycol of number-average molecular weight 1000 | 30.0 g (0.03 mol) |
| glycine | 11.3 g (0.15 mol) |
| trimellitic anhydride | 28.8 g (0.15 mol) |
| 1,2-propanediol | 23.0 g (0.3 mol) |
| N,N'—hexamethylenebis-(3,5-di-tert-butyl-4-hydroxyhydrocinnamamide) | 0.3 g |

The catalyst and procedures of Example 1 were employed. There was obtained 63 g of polymer having the properties listed below.

| | |
|---|---|
| inherent viscosity, dL/g | 1.63 |
| stress at 100% elongation, MPa | 4.8 |
| stress at 300% elongation, MPa | 7.1 |
| tensile strength at break, MPa | 30.0 |
| elongation at break, % | 635 |
| permanent set at break, % | 36 |
| trouser tear strength 21 mm/s, kN/m | 83 |
| Shore D hardness | 44 |
| Clash-Berg $T_{10000}$, °C. | −1 |
| scuff resistance test | no scuffing |

Test samples were prepared from slabs compression molded at 232° C.

EXAMPLE 3

The following materials were charged to the resin-kettle apparatus described in Example 1:

| | |
|---|---|
| poly(tetramethylene ether) glycol of number-average molecular weight 1000 | 30.0 g (0.03 mol) |
| glycine | 11.3 g (0.15 mol) |
| trimellitic anhydride | 28.8 g (0.15 mol) |
| 2,2'-oxydiethanol | 31.8 g (0.3 mol) |
| N,N'-hexamethylenebis-(3,5-di-tert-butyl-4-hydroxyhydrocinnamamide) | 0.3 g |

The catalyst and procedures of Example 1 were employed. There was obtained 65 g of polymer having the properties listed below.

| | |
|---|---|
| inherent viscosity, dL/g | 2.02 |
| stress at 100% elongation, MPa | 3.5 |
| stress at 300% elongation, MPa | 4.8 |
| tensile strength at break, MPa | 18.3 |
| elongation at break, % | 645 |
| permanent set at break, % | 50 |
| trouser tear strength 21 mm/s, kN/m | 59 |
| Shore D hardness | 38 |
| Clash-Berg $T_{10000}$, °C. | −16 |
| scuff resistance test | no scuffing |

Test samples were prepared from slabs compression molded at 232° C.

EXAMPLE 4

The following materials were charged to the resin-kettle apparatus described in Example 1:

| | |
|---|---|
| polyether glycol block copolymer of number-average molecular weight 1175 consisting of about 90% (wt) of a poly(oxypropylene) center block and about 10% of poly(oxyethylene) end groups terminated by hydroxyls ("Pluronic" L31, Wyandotte Chemical Co.) | 35.3 g (0.03 mol) |
| glycine | 11.3 g (0.15 mol) |
| trimellitic anhydride | 28.8 g (0.15 mol) |
| 1,2-propanediol | 23.0 g (0.3 mol) |
| N,N'—hexamethylenebis-(3,5-di-tert-butyl-4-hydroxyhydrocinnamamide) | 0.3 g |

The catalyst and procedures of Example 1 were employed with the exception that the reaction mixture was stirred about 3 hr under reduced pressure rather than about 1 hr. There was obtained 61.5 g of polymer having the properties listed below.

| | |
|---|---|
| inherent viscosity, dL/g | 0.94 |
| stress at 100% elongation, MPa | 1.3 |
| stress at 300% elongation, MPa | 2.3 |
| tensile strength at break, MPa | 12.8 |
| elongation at break, % | 850 |
| permanent set at break, % | 22 |
| trouser tear strength 21 mm/s, kN/m | 41 |
| Shore D hardness | 27 |
| Clash-Berg $T_{10000}$, °C. | −13 |
| scuff resistance test | no scuffing |

Test samples were prepared from slabs compression molded at 232° C.

Polyetheresterimide Polymer from β-alanine

EXAMPLE 5

The following materials were charged to the resin-kettle apparatus described in Example 1:

| | |
|---|---|
| poly(tetramethylene ether) glycol of number-average molecular weight 1000 | 30.0 g (0.03 mol) |
| β-alanine | 13.4 g (0.15 mol) |
| trimellitic anhydride | 28.8 g (0.15 mol) |
| ethylene glycol | 19.0 g (0.3 mol) |
| N,N'—hexamethylenebis-(3,5-di-tert-butyl-4-hydroxyhydrocinnamamide) | 0.3 g |

The catalyst and procedures of Example 1 were employed with the exception that the reaction mixture was stirred about 2 hr under reduced pressure rather than about 1 hr. There was obtained 55 g of polymer having the properties listed below:

| | |
|---|---|
| inherent viscosity, dL/g | 1.63 |
| stress at 100% elongation, MPa | 3.6 |
| stress at 300% elongation, MPa | 4.8 |
| tensile strength at break, MPa | 17.6 |
| elongation at break, % | 750 |
| permanent set at break, % | 89 |
| trouser tear strength 21 mm/s, kN/m | 61 |
| Shore D hardness | 38 |
| Clash-Berg $T_{10000}$, °C. | −23 |
| scuff resistance test | no scuffing |

Test samples were prepared from slabs compression molded at 232° C.
What is claimed is:

1. A thermoplastic elastomeric polyetheresterimide comprising a multiplicity of long chain esterimide units being represented by the formula

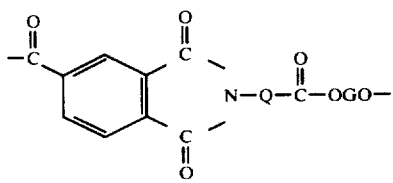

and short chain esterimide units being represented by the formula

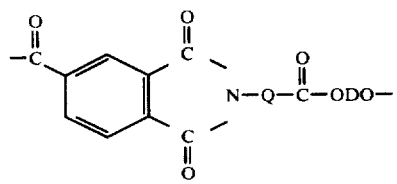

where G is a divalent radical remaining after the removal of terminal hydroxyl groups from a poly(alkylene oxide)glycol having a number average molecular weight of about 400–4000; D is a divalent radical remaining after removal of hydroxyl groups from a diol having a molecular weight less than about 300 and Q is a divalent radical remaining after removal of an amino group and a carboxyl group from an aliphatic primary amino acid having a molecular weight of less than 250; with the proviso that from about 2 to 10 of said short chain esterimide units are present for each of said long chain esterimide units.

2. A polyetheresterimide of claim 1 wherein the divalent radical Q is derived from glycine or β-alanine.

3. A polyetheresterimide of claims 1 or 2 wherein the divalent radical D is derived from ethylene glycol, 1,2-propylene glycol or 1,4-butanediol.

4. A polyetheresterimide of claims 1 or 2 wherein the divalent radical G is derived from poly(tetramethylene oxide) glycol having a molecular weight of 600–2200 or ethylene oxide-capped poly(propylene oxide) glycol having a molecular weight of 600–2800 and containing 5–35% by weight ethylene oxide.

5. A polyetheresterimide of claim 1 wherein the divalent radical Q is derived from glycine, the divalent radical D is derived from ethylene glycol and the divalent radical G is derived from poly(tetramethylene oxide) glycol having a number molecular weight of 600–2200.

6. Process for the preparation of the polyetheresterimide of claims 1 or 5 by melt condensation of a mixture of trimellitic anhydride, an aliphatic primary amino acid, a poly(alkylene oxide) glycol and a molar excess of a low molecular weight diol, said trimellitic anhydride and said amino acid being present in a molar ratio of 1.0:0.85 to 1.0:1.15.

* * * * *